United States Patent [19]

Hayashi et al.

[11] Patent Number: 5,473,595
[45] Date of Patent: Dec. 5, 1995

[54] INFORMATION PROCESSOR USING PROCESSORS TO RAPIDLY PROCESS DATA STORED ON AN OPTICAL STORAGE MEDIUM

[75] Inventors: Teruki Hayashi; Kunihiro Tanaka, both of Kyoto; Hideki Tanaka, Okayama; Hiroyuki Nozawa, Osaka; Kouichi Sano, Kyoto, all of Japan

[73] Assignee: Nintendo Co., Ltd., Japan

[21] Appl. No.: 155,749

[22] Filed: Nov. 23, 1993

[30] Foreign Application Priority Data

Nov. 27, 1992 [JP] Japan ................. 4-341338

[51] Int. Cl.[6] .............................................. G11B 7/00
[52] U.S. Cl. ........................... 369/124; 369/83; 369/60
[58] Field of Search ................................ 369/59, 84, 60,
369/83, 47, 49, 54, 48, 44.32, 124; 395/162,
166, 650; 364/931.49, 228, 281.4

[56] References Cited

U.S. PATENT DOCUMENTS

| | | | |
|---|---|---|---|
| 4,107,780 | 8/1978 | Grimsdale et al. | 395/135 |
| 4,590,555 | 5/1986 | Bourrez | 395/650 |
| 5,150,462 | 9/1992 | Takeda et al. | 395/166 |
| 5,200,944 | 4/1993 | Souma | 369/124 |
| 5,224,089 | 6/1993 | Matsumura et al. | 369/124 |
| 5,313,443 | 5/1994 | Iitsuka | 369/48 |
| 5,315,570 | 5/1994 | Miura et al. | 369/124 |

FOREIGN PATENT DOCUMENTS

| | | |
|---|---|---|
| 0495518A1 | 1/1992 | European Pat. Off. . |
| 0495574A2 | 1/1992 | European Pat. Off. . |
| 54-66735 | 5/1979 | Japan . |
| 58-106650 | 6/1983 | Japan . |
| 62-111339 | 5/1987 | Japan . |

*Primary Examiner*—Nabil Z. Hindi
*Attorney, Agent, or Firm*—Nixon & Vanderhye

[57] ABSTRACT

An information processing apparatus using an optical storage medium such as a CD-ROM processes optically stored data using different capability data processors having different processing speeds and/or operand bit-width processing. Picture data, program data, and audio data stored in the optical storage medium are accessed and written into a main semiconductor type RAM. Selective routing over various data buses to specific data processors permits a data processing task to be performed by the data processor best suited to perform that task in the most efficient and effective manner.

18 Claims, 9 Drawing Sheets

INFORMATION PROCESSOR USING PROCESSORS TO RAPIDLY PROCESS DATA STORED ON AN OPTICAL STORAGE MEDIUM

BACKGROUND OF THE INVENTION

1. Field of the Invention

The present invention relates to an information processor using an optical storage medium, and more particularly to an information processor for processing data at a faster rate when an optical storage medium such as an optical disk is used as a storage medium as opposed to other types of storage for image processing system such as a video game machine or a home computer.

An image processing system with a plurality of central processing units (CPUs) is disclosed for example in Japanese Patent laid open Publications 56-66735/1981, 56-124964, 58-106650/1983. These systems have the same kind of CPUs as to the processing rate and the bit number, i.e., the number of bits in data operands processed by the CPU. The CPUs or processors are connected in parallel to a main common storage device such as a semiconductor memory, so that any CPU or processor among them can access the main storage device, and the program to be processed can be distributed among the CPUs.

However, in the above-mentioned prior arts, if the storage device is an optical storage medium as a CD-ROM or an optical disk, the CPUs cannot access the optical storage medium directly with using time sharing. Further, such a system using the same kind of CPUs cannot be applied because the data are stored in a bit serial format and/or they are stored after data compression. For example, the data read optically from an optical storage medium must be converted to a data format used by the CPUs, and if the data is compressed, it must be expanded. These delays plus complex operations with respect to the data result in a long processing time and user wait. On the other hand, if a plurality of CPUs of fast processing time is used, the cost of the system becomes high. Further, if the system is constructed using an information processing unit already sold, it is impossible to change all CPUs to CPUs of faster processing time.

SUMMARY OF THE INVENTION

An object of the present invention is to provide an information processing system with a plurality of processors to process data from an optical storage medium wherein processors of different kinds are used according to the content of the processing so that the processing is efficient and the operating time is short to reduce the wait time of a user.

Figure 1:
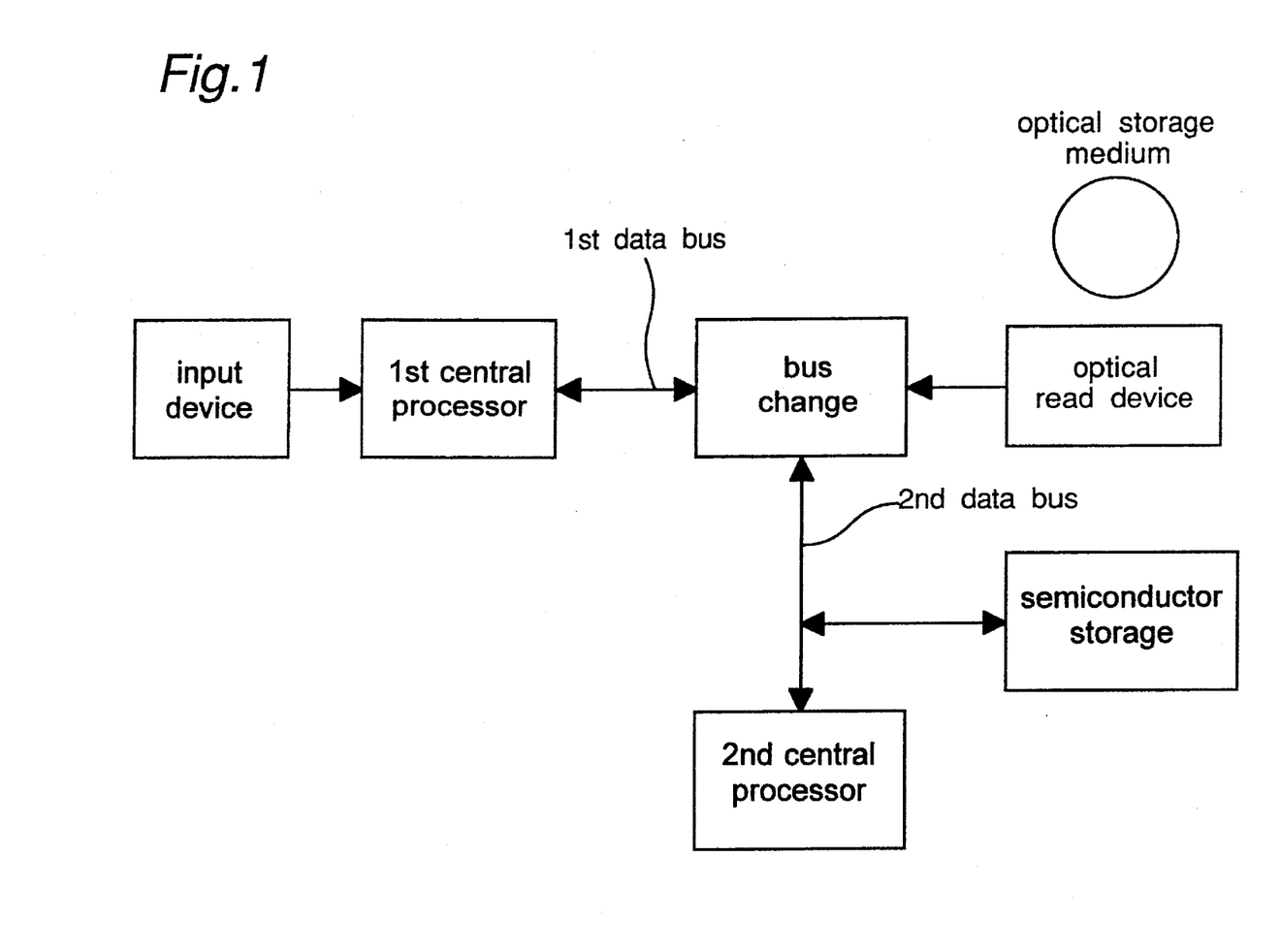
FIG. 1 is a diagram on the principle of the present invention.

The present invention relates to an information processing apparatus conducting information processing based on data stored in an optical storage medium which stores data including picture processing data. The optical storage medium may be an optical disk including a CD-ROM is connectable to the information processing apparatus. As shown in FIG. 1, the information processing system comprises an optical reader, a semiconductor storage, a first central processor, a second central processor, a first data bus, a second data bus, and a bus selector. Data can be written in and read from the semiconductor storage, and it stores data sent from the optical reader in an as-received data format. The first data bus is connected to the first central processor, while the second data bus is connected to the semiconductor storage and to the second central processor. The second central processor processes data better than the first one (for example a larger number bits in data operands to be handled at an access or the processing speed). Preferably, the bit width of a data operands to be handled by the second central processor is a natural number times that of the first one. Preferably, a non-volatile storage stores a start program for controlling the bus selector at start-up and after start-up.

At start-up, the first central processor drives the optical reader according to the start program stored in the non-volatile storage preferably and it selects the first mode by controlling the bus selector to connect the optical reader to the semiconductor storage via the second data bus. Then, the optical reader reads optically the data stored in the optical storage medium. The serially read data are stored temporarily in the semiconductor storage in as-received data format. Then, the first central processor selects the second mode by controlling the bus selector to disconnect the first data bus from the second one. Thus, only the second central processor uses the second data bus. Thus, the second central processor performs a preliminary operation (such as data expansion of the as-received picture data or a dispersed processing routine which needs to be processed at a faster rate for a game program to be processed by the first central processor) by processing the data stored temporarily in the semiconductor storage and writes the result of the operation in the semiconductor storage. Then, the first central processor selects the third mode to connect the first and the second data buses so that the first central processor can access the semiconductor storage. In the third mode, when a user inputs instructions by using an input device such as a joy stick, the first central processor performs a processing for an inherent object of the information processor based on the instructions with the input device and the data stored in the semiconductor storage and conducts a different processing for an inherent object of the information processing apparatus based on the results of the preliminary operation.

Preferably, the optical storage medium stores at least picture data and program data optically. The second central processor conducts a preliminary operation relevant to the picture processing based on the program data stored in the semiconductor storage and writes the result in the semiconductor storage. On the other hand, the first central processor conducts an inherent processing by performing the program data stored in said semiconducting storage and/or by performing an inherent processing for displaying a picture on the picture data based on the result of the preliminary operation.

Preferably, the information processing apparatus further comprises a second semiconductor storage which can write and read data for storing data, such as audio data compressed with adaptive differential pulse code modulation sent, from the optical read means in an as-received data format, and a third central processor processes data stored in the second semiconductor storage means. A second data bus is connected to the third central processor and to the second semiconductor storage, and the bus selector can connect the third data bus to the optical reader. Preferably, a data converter is connected to the third bus for demodulating the compressed audio data stored in the second semiconductor storage with adaptive differential pulse code demodulation.

Preferably, the information processing apparatus further comprises a third semiconductor storage connected to the bus selector so that the third semiconductor storage can be connected to a plurality of blocks including at least either of said first and second data buses and the optical reader. Thus, a plurality of the blocks can used the third semiconductor commonly, and the second central processor of superior data handling capacity can deal the data stored in the third semiconductor.

An advantage of the present invention is that the operating time becomes faster and that the wait time of a user can be reduced to a large extent by the bus control for the plurality of different central processing means by using an optical storage medium for data stored in the optical storage means.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 2:
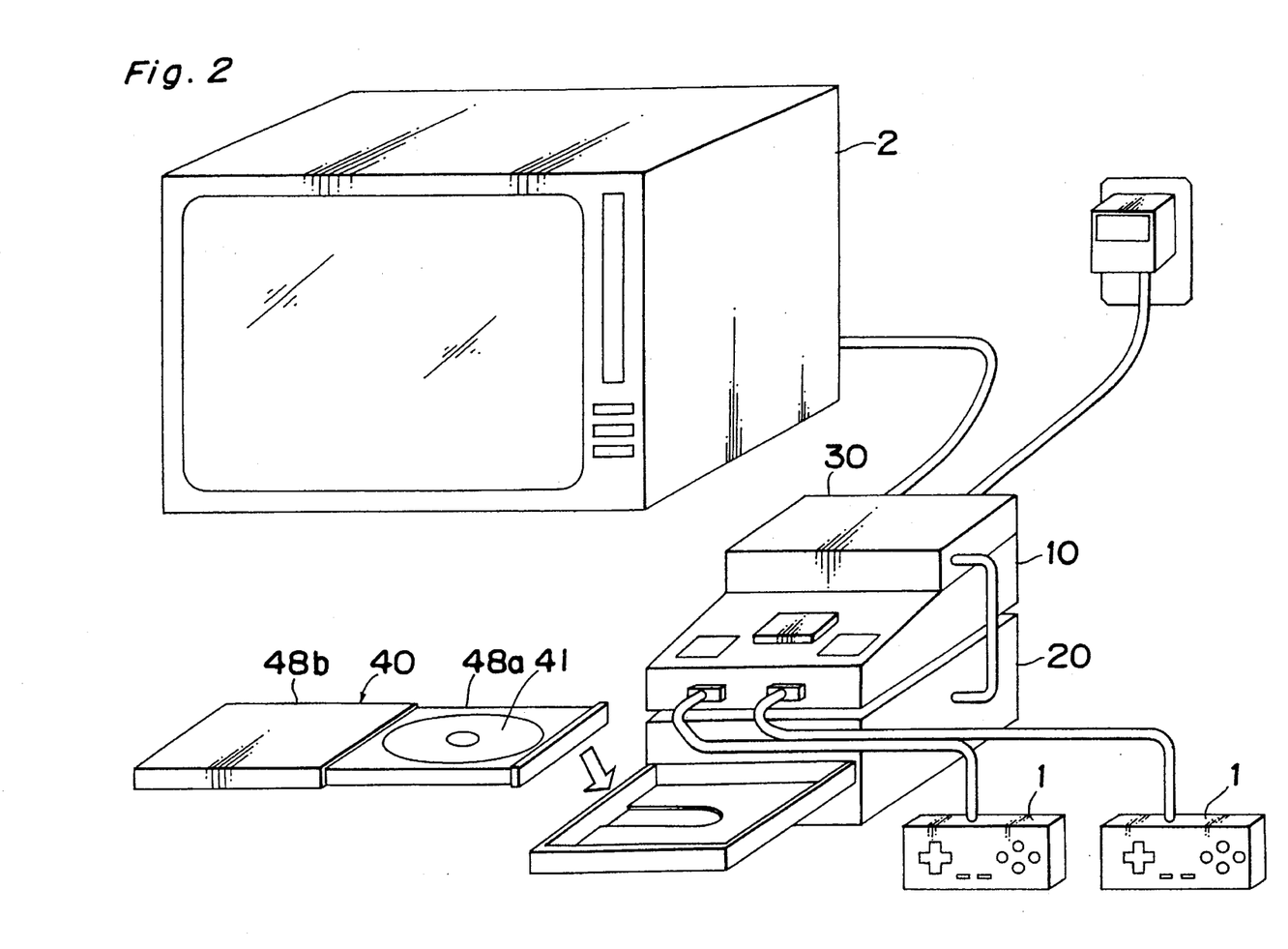
FIG. 2 is a perspective view of an information processing system using an optical storage medium of an embodiment according to the present invention.

Referring now to the drawings, wherein like reference characters designate like or corresponding parts throughout the several views, FIG. 2 shows a perspective view of an information processing apparatus of an embodiment according to the present invention. In FIG. 2, the information processing apparatus comprises an image processor 10, an optical reproduction unit 20 and a system cartridge 30. The image processor 10 is for example a video game machine sold before the optical reproduction unit 20 and the system cartridge are sold. The optical reproduction unit 20 is connected to the image processor 10 via the system cartridge 30. An optical storage device (hereinafter referred to as "optical disk cartridge") 40 as an example of a secondary storage medium containing an optical disk (refer FIG. 4) can be connected and disconnected to the optical reproduction unit 20. The optical disk cartridge 40 comprises a container 48 consisting of a tray 48a for putting a CD-ROM 41 and a case 48b therefor. The CD-ROM 41 is set on the tray 48a, which is inserted into the case 48b. Then, the container 48 is put on a sliding case of the optical reproduction unit 20, and the container is inserted into the inside thereof. Thus, the CD-ROM 41 can be reproduced with the optical storage reproduction unit 20.

Figure 3:
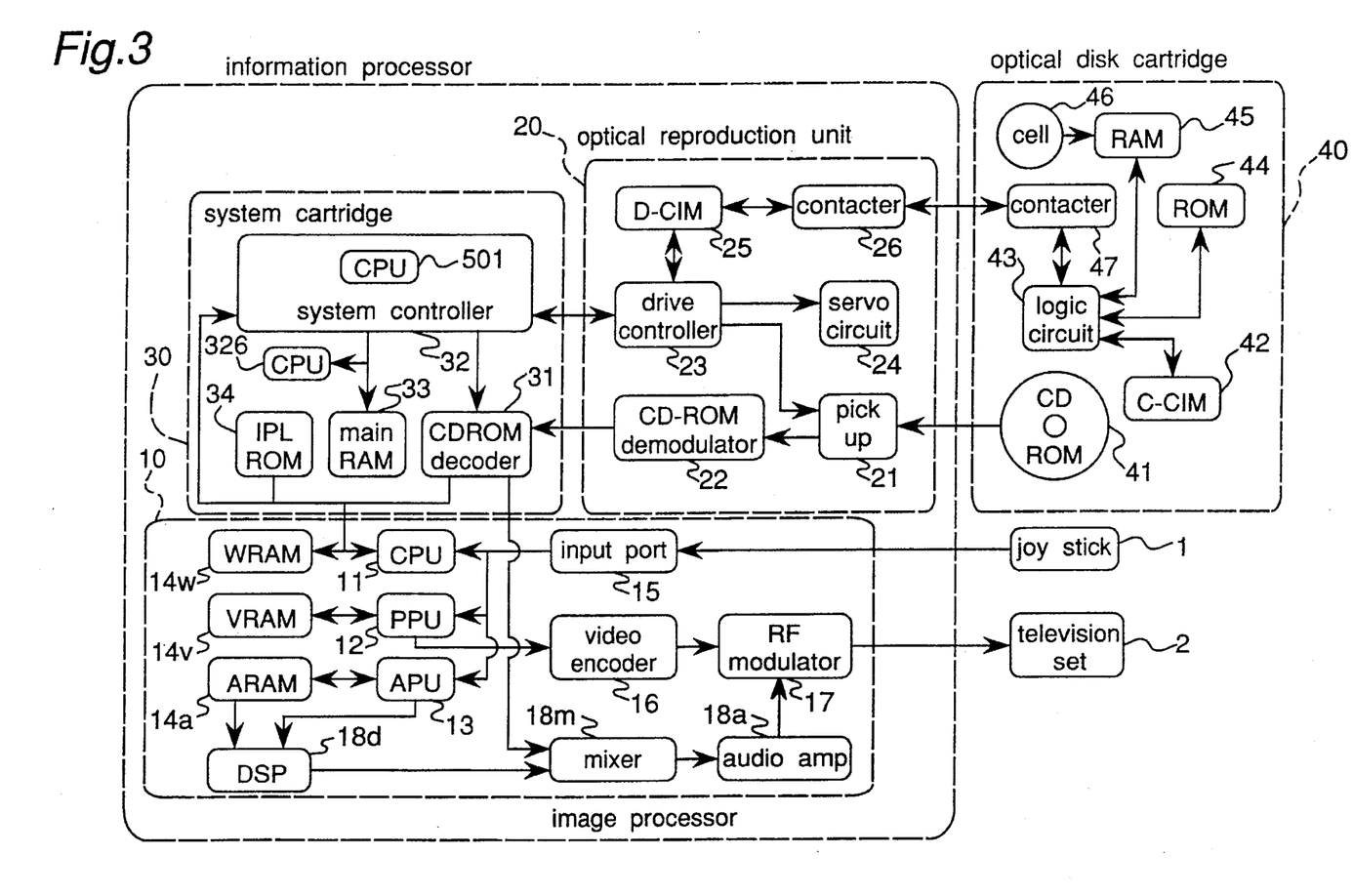
FIG. 3 is a block diagram of the information processing system using an optical storage medium of an embodiment according to the present invention.

FIG. 3 shows a block diagram of the information processing system using an optical storage medium. In FIG. 3, the image processor 10 performs picture processing and voice processing according to a program data provided from a ROM cartridge (not shown) or from a secondary storage medium (CD-ROM), and it includes a central processing unit (hereinafter referred to "CPU") 11 for processing a game program or the like. The CPU 11 (for example 65C816) processes data of relatively slow rate and/or in data operand units of smaller bit number, e.g., 16 bits. A picture processing unit (hereinafter referred to also as "PPU") 12 and an audio processing unit (hereinafter referred to also as "APU") 13 are connected to the CPU 11. The CPU 11 and the PPU 12 cooperate with each other for picture processing. A working RAM (W-RAM) 14w is connected to the CPU 11. The storage capacity of the W-RAM 14w is much smaller than that of the CD-ROM 41 and smaller than that of the main RAM 33, and for example it is selected to have a value (say 256 kilobytes) so that the data transfer is not needed during a constant period (a vertical period or a few frame periods) for picture processing.

A video RAM (V-RAM) 14v is connected to the picture processing unit 12. An audio RAM (A-RAM) 14a is connected to the audio processing unit 13. An operation device (joy stick) 1 sends operation signals via an input port 15 to the CPU 11. The picture signal output of the picture processing unit 12 are sent to a video encoder 16 and to a high frequency (RF) modulator 17. A digital signal processor (DSP) 18d is connected via address and data buses to the audio processing unit 13 and to the audio RAM 14a. The DSP 18d converts digital data to an analog signal with a waveform and frequencies for outputting a desired audio signal, and sends it via a mixer 18 and an audio amplifier 18a to an RF modulator 17. The RF modulator 17 generates a complex video signal synthesizing a video signal and an audio signal to a television set 2.

An optical disk cartridge 40 is explained in detail with reference to FIG. 3. The optical disk cartridge 40 comprises an optical disk (CD-ROM) 41 which stores data optically. The CD-ROM 41 stores picture data, program data and audio data optically, for example in a Reed-Solomon code format. Besides a program for an inherent object or application (e.g., a game) of the image processor 10, the program data includes a preliminary processing program for processing the application program effectively, for example the expansion of the compressed data, sophisticated application level of processing, e.g., in a game application, a thinking routine in a simulation game, a chess game or the like, a decision of hit or the like. Further, the optical disk cartridge 40 includes a first security element (C-CIM) 42 used for checking the legitimacy of the CD-ROM 41. The first security element 42 comprises a one-chip 4-bit microprocessor or the like, not shown in FIG. 4, including a CPU core, a buffer RAM and a program ROM. A logic circuit 43 is connected to the first security element 42. A ROM 44 as a non-volatile storage is connected to the logic circuit 43. The ROM 44 stores a name data used for deciding the legitimacy of the CD-ROM 41 and a name address for representing the storage address (or area) of the name data. A read and write memory (RAM) 45 is connected to the logic circuit 43 in order to store backup application specific data, e.g., points, a progress report, and the like during a game. The RAM 45 is backed up with a battery 46 to prevent the volatility of data. Further, a contacter (connection points) 47 is connected to the input and output terminals of the logic circuit 43 so as to provide data to the optical reproduction unit 20 through electrical contact. In the embodiment, the CD-ROM 41 is enclosed in a cartridge case 48 so that the CD-ROM 41 can be contained into or taken out from the cartridge case 48. The cartridge case 48 comprises the first security element 42, the logic circuit 43, the ROM 44 and the RAM 45 integrated as one body in the cartridge case 48 so that the contacter 47 can be exposed with a shutter (not shown).

The optical reproduction unit 20 comprises a pick-up 21 for reading optically the storage data in the optical disk (CD-ROM) 41. The pick-up 21 is provided in a position in correspondence to the CD-ROM 41 when the shutter (not shown) is opened to connect the optical disk cartridge 40 to the unit 20. The pick-up 21 reads image data, program data and acoustic data in the Reed-Solomon code format or the like from the CD-ROM 41, and the data are decoded with a demodulator decoder 22 respectively. The decoded image data, program data and acoustic data are sent to a decoder 31 included in the system cartridge 30. The optical reproduction unit 20 comprises a drive controller 23 for controlling the position of the pick up 21. A servo circuit 24 is connected to the drive controller 23 for the revolution control of the CD-ROM 41, the movement of the pick up, and the control of focusing. Further, a contacter (a connection point) 26 is connected to the drive controller 23 via a second security element (DCIM) 25. The second security element 25 comprises a one-chip 4-bit microprocessor or the like including a CPU core, a buffer RAM and a program ROM, similarly to the first one 43. The second security element 25 decides the legitimacy of the first security processor 42 and instructs the first security processor 42, and receives a name address from the ROM 44 and back up data from the RAM 45 and sends that data via the drive controller 23 to a system controller 32.

The system cartridge 30 is inserted in a cartridge inlet (not shown) of the image processor 10 and provides picture data and audio data received from the optical reproduction unit 20 to the image processor 10. A conversion circuit 31 included in the system cartridge 30 demodulates and converts the picture data, the program data, and the audio data read from the CD-ROM 41 such as serial-to-parallel conversion and the like and sends that data via a system controller 32 to the CPU 11 and decoded audio signals to the mixer 18m.

The system cartridge 30 comprises the system controller 32. The system controller 32 controls the optical reproduction unit 20, Further, if the CPU 11 disables the system in response to a negative decision of the security element 42 on the legitimacy of the CD-ROM 41, the system controller 30 prohibits the reproduction of various data stored in the CD-ROM. Further, the system cartridge 30 includes a main RAM 33 and an IPL ROM 34. The IPL ROM 34 stores an initial load program for activating the CPU 11 before reading the data of the CD-ROM 41 beforehand.

Figure 4:
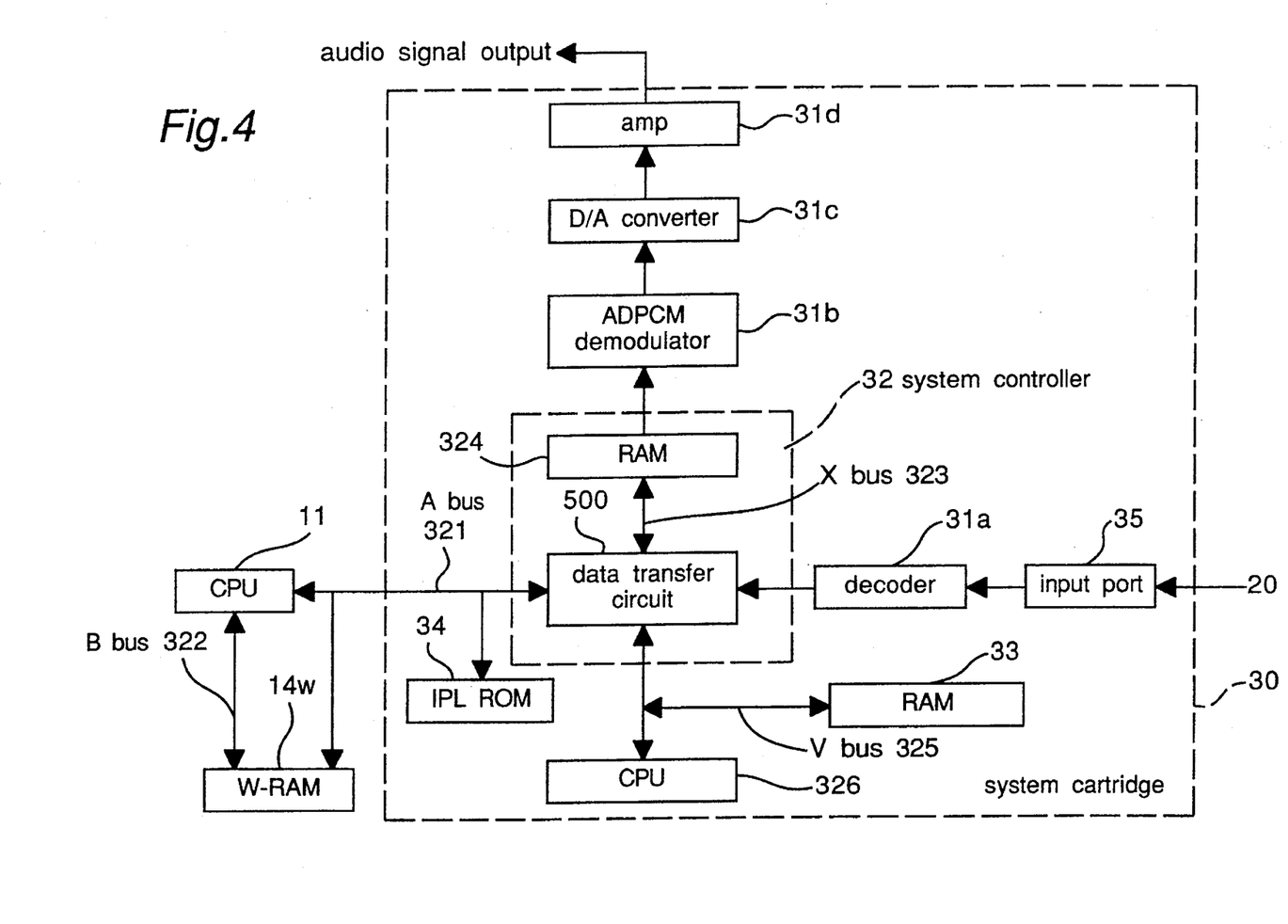
FIG. 4 is a block diagram of a system cartridge.

FIG. 4 shows a block diagram of the system cartridge 30 below in detail. The conversion circuit 31 comprises a serial-to-parallel conversion circuit 31a for the serial-to-parallel conversion of the picture data and the program data and a demodulator 31b for demodulating the audio data of adaptive differential pulse code modulation (AD-PCM). The demodulator 31b is connected via a digital-to-analog converter (DA) 31c and an amplifier 31d to the mixer 18m. The system controller 32 comprises a data transfer circuit 500 for data transfer and/or operation control. The data transfer circuit 500 comprises a CPU 501 such as 65C02 as will be explained later with reference to FIG. 5. In the data transfer circuit 500, an "A" bus (first bus) 321 and a "B" bus 322 connected to the CPU 11. The "A" bus 321 comprises for example a 24-bit address bus and an 8-bit data bus. The ROM 34 is connected to the "A" bus 321. The "B" bus 322 comprises for example an 8-bit address bus and the data bus is used commonly with the "A" bus 321. A RAM 324 is connected via an "X" bus 323 to the data transfer circuit 500. The RAM 324 stores audio data read from the CD-ROM 41 in the as-read format (compressed data) temporarily. The "X" bus 323 comprises an 18-bit address bus and a 16-bit data bus. Further, the RAM 33 is connected via a "V" bus 325 to the data transfer circuit 500, while a RISC type processor 326 which can process a data of a large bit number (say 32 bits) at a fast processing rate is also connected via a "V" bus 325 to the data transfer circuit 500. The "V" bus 325 comprises an 18-bit address bus and a 32-bit data bus. The RAM 33 comprises for example two D-RAMs of 4 megabytes connected in parallel.

Figure 5:
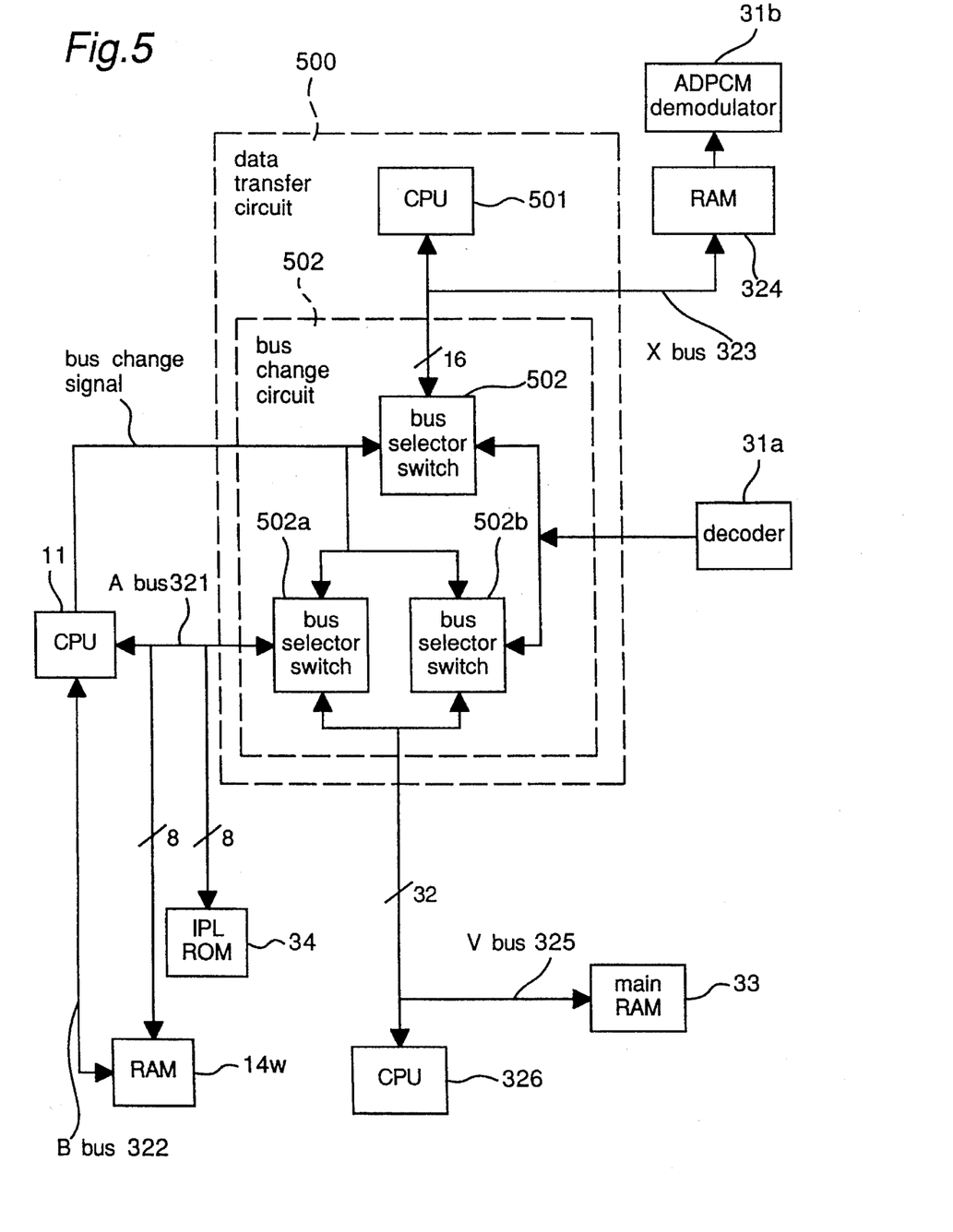
FIG. 5 is a block diagram of a data transfer circuit.

FIG. 5 shows a block diagram of the data transfer circuit 500 comprising a CPU 501 of for example 65C02. The CPU 501 is connected via an internal bus to a bus selector 502. The bus selector 502 comprises three switches 502a, 502b and 502c operated according to a bus change signal provided from the CPU 11 according to the start ROM 34. The bus selector 502 is connected to the "A" bus 321, the "V" bus 325 and the optical reproduction unit 20 through a decoder 31a and the input port 35. The switch 502a connects the "A" bus 321 to the "V" bus 325, the switch 502b connects the "V" bus 325 to the optical reproduction unit 20 and the switch 502c connects the "X" bus 323 to the optical reproduction unit 20. In the first mode (file read mode), the bus selector 502 connects the optical reproduction unit 20 to the "X" bus 323 so as to transfer the audio data read from the CD-ROM 41 to the RAM 324, while it connects the optical reproduction unit 20 to the "V" bus 325 so as to transfer the picture data and the program data read from the CD-ROM 41 to the RAM 33. Further, in the second mode (preliminary processing mode), the bus selector 502 disconnects the "V" bus 325 and the "A" bus 321. Still further, in the third mode (an inherent processing mode of the CPU 11) related to executing the application, e.g., a game, etc., the bus selector 502 connects the "V" bus 325 and the "A" bus 321. In the third mode, the CPU 11 sends a stop signal to the CPU 326 to use the main RAM 33 exclusively.

Figure 6:
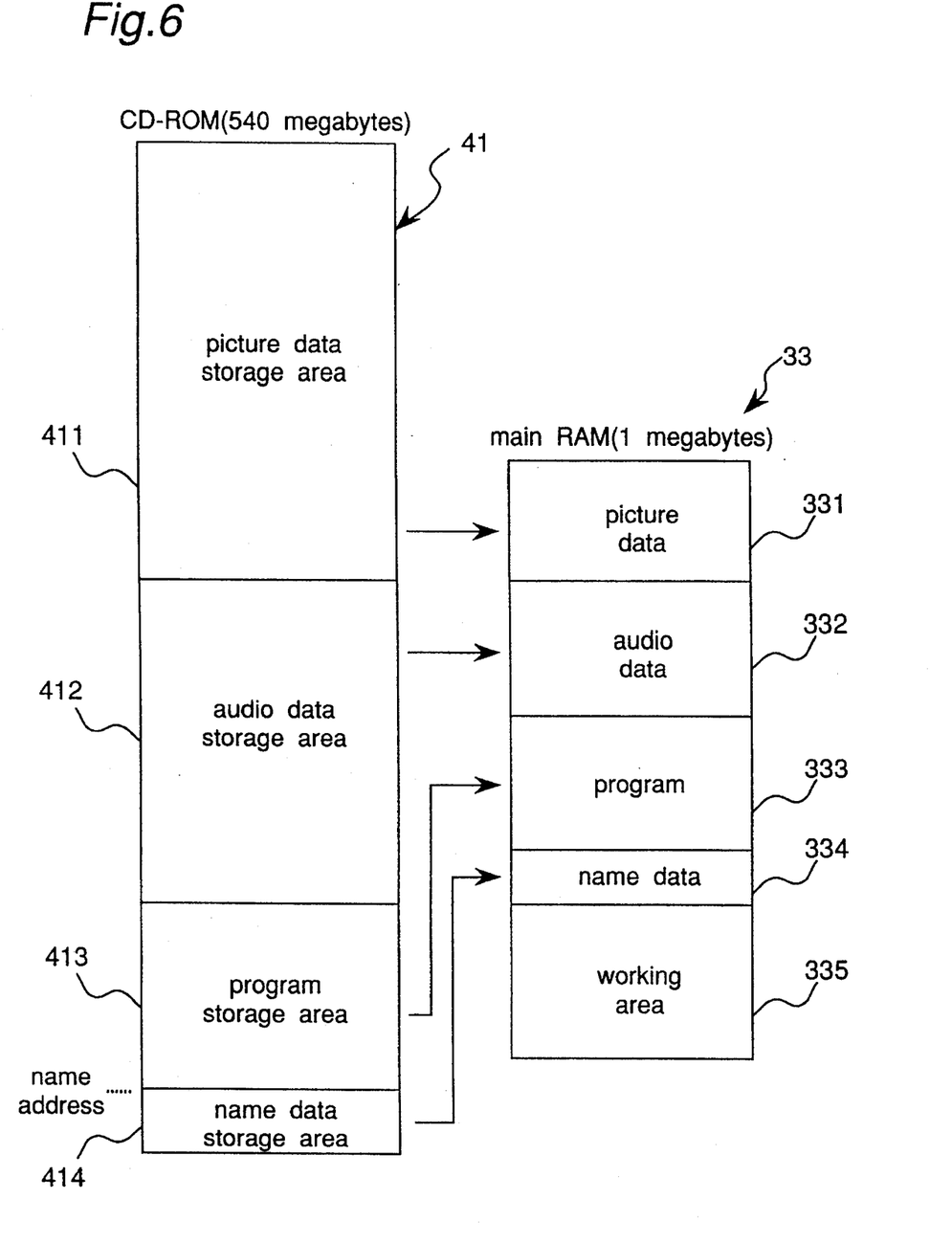
FIG. 6 is a schematic memory maps of CD-ROM 41 and main RAM 33.

FIG. 6 shows a schematic memory maps of the CD-ROM 41 and the main RAM 33. In FIG. 6, the CD-ROM 41 has a very large storage capacity (for example 540 megabytes), and it includes a picture data storage area 411 for storing picture data, an audio data storage area 412 for storing an audio data, a program data storage area 413 for storing a program data of the control of a game such as picture image display based on picture data, the generation of audio data and the like, and a name data storage area 414 for storing a name data. Data for a game comprises the picture data, the audio data and the program data stored in the storage areas 411–413. The name data comprises an inherent code of a kind of CD-ROM 41, a maker or a person having a copy right, and it is used for deciding if it is the same as or has a prescribed relation to the name data stored in the ROM for deciding the correlation to the cartridge case 48. The address for storing the name data is called a name address. The name data may also be stored in one of the storage areas 411–413.

The main RAM 33 has a storage capacity (for example 1 megabyte) smaller than that of the CD-ROM 31 and is not needed to transfer data frequently for picture processing. The main RAM 33 stores a unit of data needed for picture processing and audio processing temporarily according to the usage such as a game. For example, the main RAM 33 includes a storage area 331 for storing picture data, a storage area 332 for storing audio data, a storage area 333 for storing program data and a storage area 334 for storing a name data read from the CD-ROM 41 temporarily. The main RAM 33 is used as a main storage means and it stores the first data in the storage areas 331–333 and the second data in the storage area 334. The data stored temporarily in the storage areas 331–333 and 335 in the RAM 33 are used to perform an inherent action such as a game processing, for example processings based on the picture processing, audio processing or the operation of the operation device.

In the embodiment shown in FIGS. 3 and 4, three CPUs 11, 326 and 501 are used for the reason explained below. When the data stored optically in the CD-ROM 41 is reproduced, error correction is needed which takes a certain operation time. If only the CPU 11 is used and must perform the error correction the inherent game processing and picture processing, must be interrupted, and this spoils the spirit of a game. Further, because the audio data are stored in the CD-ROM 41 as AD-PCM data, the demodulation of the audio data is a large data processing burden for the CPU 11. The CPU 11 therefore is used for error correction, demodulation control of the AD-PCM data, the audio output control or the like. Further, the CPU 326 is used for preliminary processing of processings required to be processed at a faster rate, such as data expansion of compressed data, processing of a thinking routine of a simulation game, a chess game or the like, the detection of hit or the like in a game.

Figure 7:
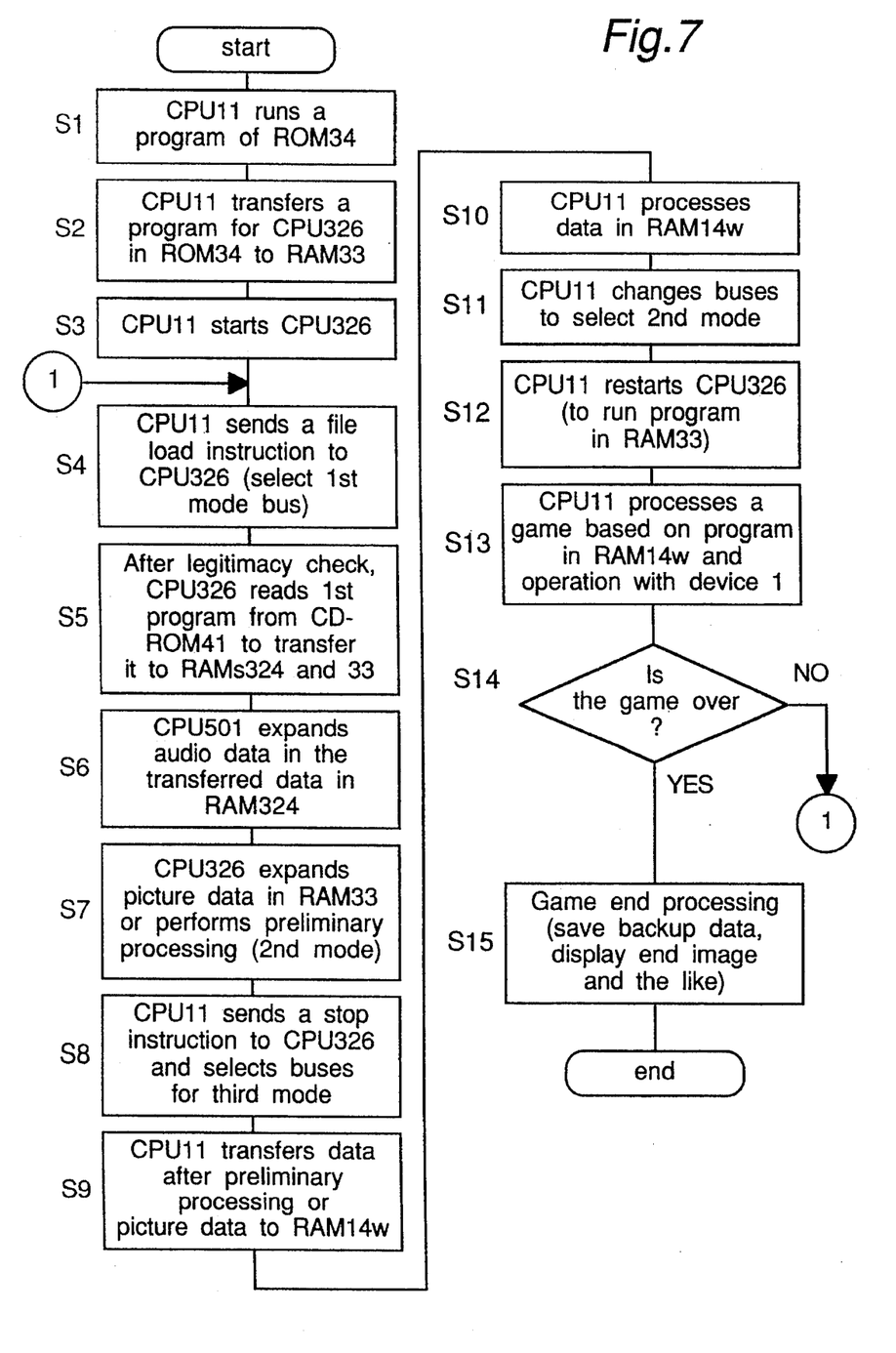
FIG. 7 is a flowchart on the action of an embodiment of the present invention.

FIG. 7 shows a flowchart for explaining the action of one embodiment of the present invention. Before starting the application, a user sets a system cartridge 30 in an insertion area in the image processor 10 and sets a CD-ROM 41 in the optical reproduction device 20. Then, a user turns on a power switch (not shown) provided in the image processor 10.

At step S1, the CPU 11 runs a start-up (IPL) program stored in the ROM 31 in response to the turn on of the power switch. At step S2, the CPU 11 sends a transfer program included in the start-up program stored in the ROM 34 to the main RAM 33. The transfer program is used to transfer the data to CPU 326 in correspondence to the capacity of the main RAM 33 in various kinds of data in the CD-ROM 41 to be processed. At step S3, the CPU 11 sends a start instruction to the CPU 326. Further, at step S4, the CPU 11 selects the first mode by connecting the "V" bus 325 to the input port 35, and sends a transfer instruction of a file of the CD-ROM 41 to the CPU 326. At step S5, the security elements 42 and 25 perform the decision of the legitimacy such as the permission of the use of the CD-ROM 41 (not explained in detail here). Further, the CPU 326 writes picture data, program data and the like read from the CD-ROM 41 with the optical reproduction unit 20 into the main RAM 33. At this time, the CPU 11 connects the "X" bus 323 to the input port 35 and writes the audio data read from the CD-ROM 41 in the RAM 324. Thus, the data reproduced from the CD-ROM 41 are transferred to the RAM 33 and/or 324 in the as-read format.

At step S6, the CPU 501 expands the audio data transferred to the RAM 324. For example, the CPU 501 sends a demodulation instruction to the AD-PCM demodulation circuit 31b to perform AD-PCM demodulation. At step S7, the CPU 11 sends a change signal to the bus selector 502 to disconnect the "A" bus 321 and the "V" bus 325 so that the CPU 326 uses the "V" bus 325 exclusively (or the CPU 11 selects the second mode). Thus, the CPU 326 used the RAM 33 exclusively to perform an expansion processing of picture data stored in the RAM 33 or a preliminary processing of program data (such as data expansion of picture data, a thinking routine of a simulation game or a chess game or a hit detection). The result of this preliminary processing is written in the main RAM 33 by the CPU 326.

Then, the CPU 11 performs the operation of step S8 at a constant timing (such as each vertical blanking period). That is, at step S8, the CPU 11 sends a bus change signal to the bus selector 502 to select the third mode by connecting the "A" bus 321 and the "V" bus 325, and makes it possible for the CPU 11 to access the main RAM 33. At the same time, the CPU 11 stops the operation of the CPU 326 temporarily during the third mode. At step S9, the CPU 11 reads from the RAM 33 the data after the preliminary processing processed by the CPU 326 and stored in the main RAM 33 and transfers them via the bus selector 502 and the "A" bus 321 to the working RAM 14w. Next, at step S10, the CPU 11 processes the data stored in the working RAM 14w and writes an instruction for a preliminary processing to be carried out in the second mode by the CPU 326. In other words, by writing the instruction during the third mode, when the mode is changed to the second mode after the elapse of a constant period (a vertical blanking period), the CPU 326 can be started again.

Further, after the elapse of the constant period, at step S11, the CPU 11 sends a bus change signal to the bus selector 502 to select the second mode by disconnecting the "A" bus 321 and the "V" bus 325. At step S12, the CPU 11 restarts the CPU 326. At step S13, the CPU 11 performs a game processing according to the program of the working RAM 14w and the operation with the operation device 1. Therefore, after the second mode is selected again, the CPU 326 runs the program (such as preliminary processing program) stored in the main RAM 33 at a fast rate, while the CPU 11 runs the program (such as a program for an inherent object of the image processor 10) of the working RAM 14w. Thus, CPUs of different kinds perform different processings tasks in parallel and each CPU performs a most appropriate processing suitable for the respective kind of CPU.

At subsequent step S14, the CPU decides if the game is over. If is decided that the game is not over, the flow returns to step S4 to repeat steps S4–S14. On the other hand, if it is decided that the game is over, game completion processing is performed at step S15. For example, a picture image for showing that the game is over is displayed on a television screen or backup data in the midst of the game are stored in the RAM 45 in the optical disk cartridge 40.

In the embodiment explained above, the CPU 501 and the RAM 324 are provided to process the AD-PCM of audio data exclusively. However, the CPU 326 may perform this function, and the main RAM 33 having a large capacity can be used instead of the RAM 324.

Further, in this embodiment, it is assumed that the optical reproduction unit 20 and the system cartridge 30 are sold later to connect them to an already constructed/purchased image processor 10. However, the image processor 10, the optical reproduction unit 20 and the system cartridge 30 can be constructed as an integrated system.

Figure 8:
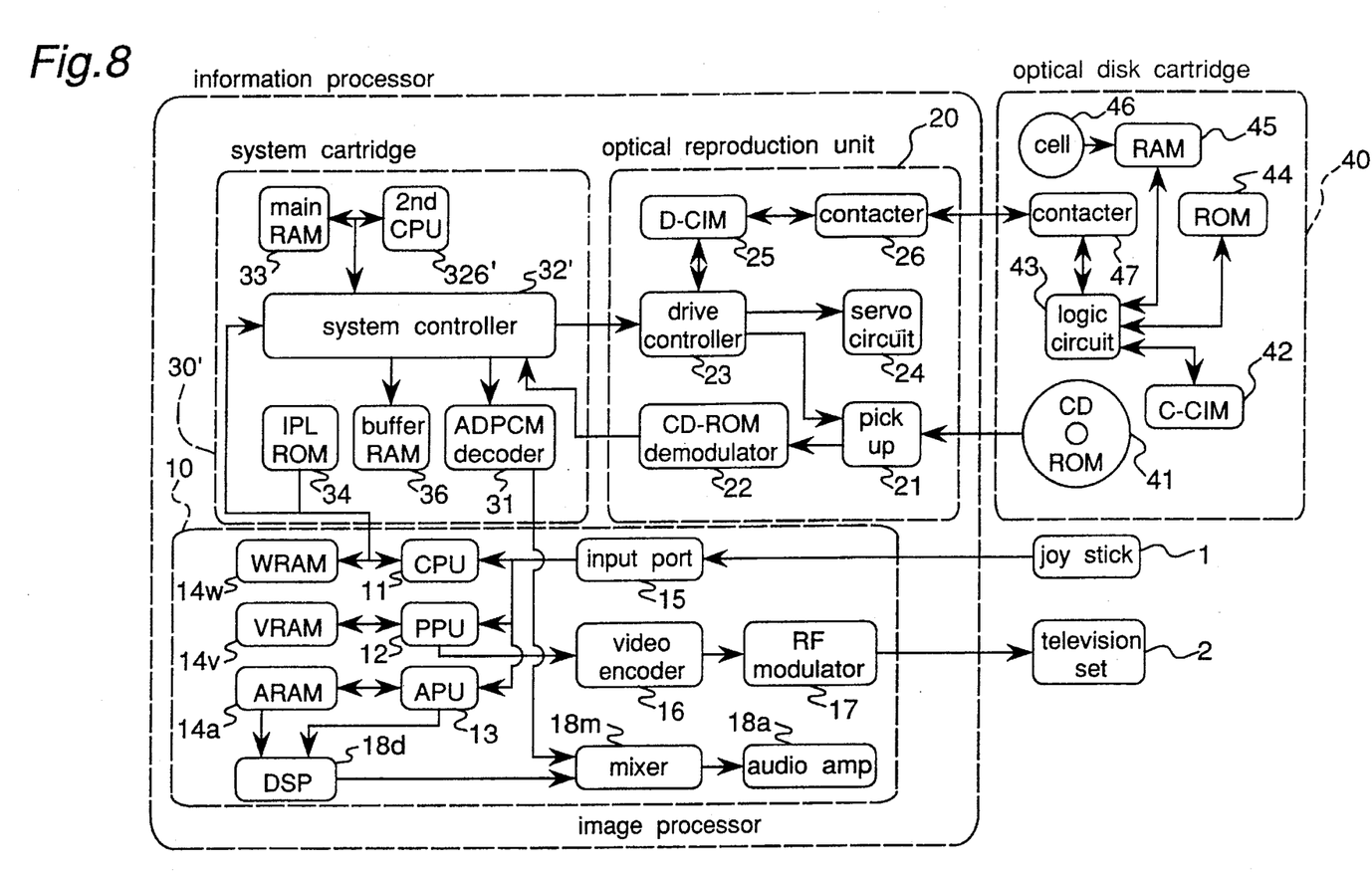
FIG. 8 is a block diagram of a second example of a system controller of an information processing system using an optical storage medium.

Next, a second embodiment of the present invention is explained. In the first embodiment, the main RAM 33 is used commonly by different CPUs. FIG. 8 shows a block diagram of the second example which is different from the first embodiment shown in FIG. 3 only on the structure of the system cartridge. The system cartridge 30' of the second embodiment comprises an external second CPU 326' of superior data handling capacity as in the first embodiment, but it is located outside the system controller 32'. The main RAM 33 is connected both to the second CPU 326 and to the system controller 32'. Therefore, if a new CPU of superior data handling capacity is developed, a system cartridge including the new CPU can be exchanged with the old one, so that the first CPU 11 can be used effectively.

Further, a buffer RAM 36 is connected to the system controller 32' in order to used the CPU 326' more effectively. By using the buffer RAM 36 commonly, data from various data sources can be stored in the buffer RAM 36 so that the CPU 326' can process data in the buffer RAM 36.

Figure 9:
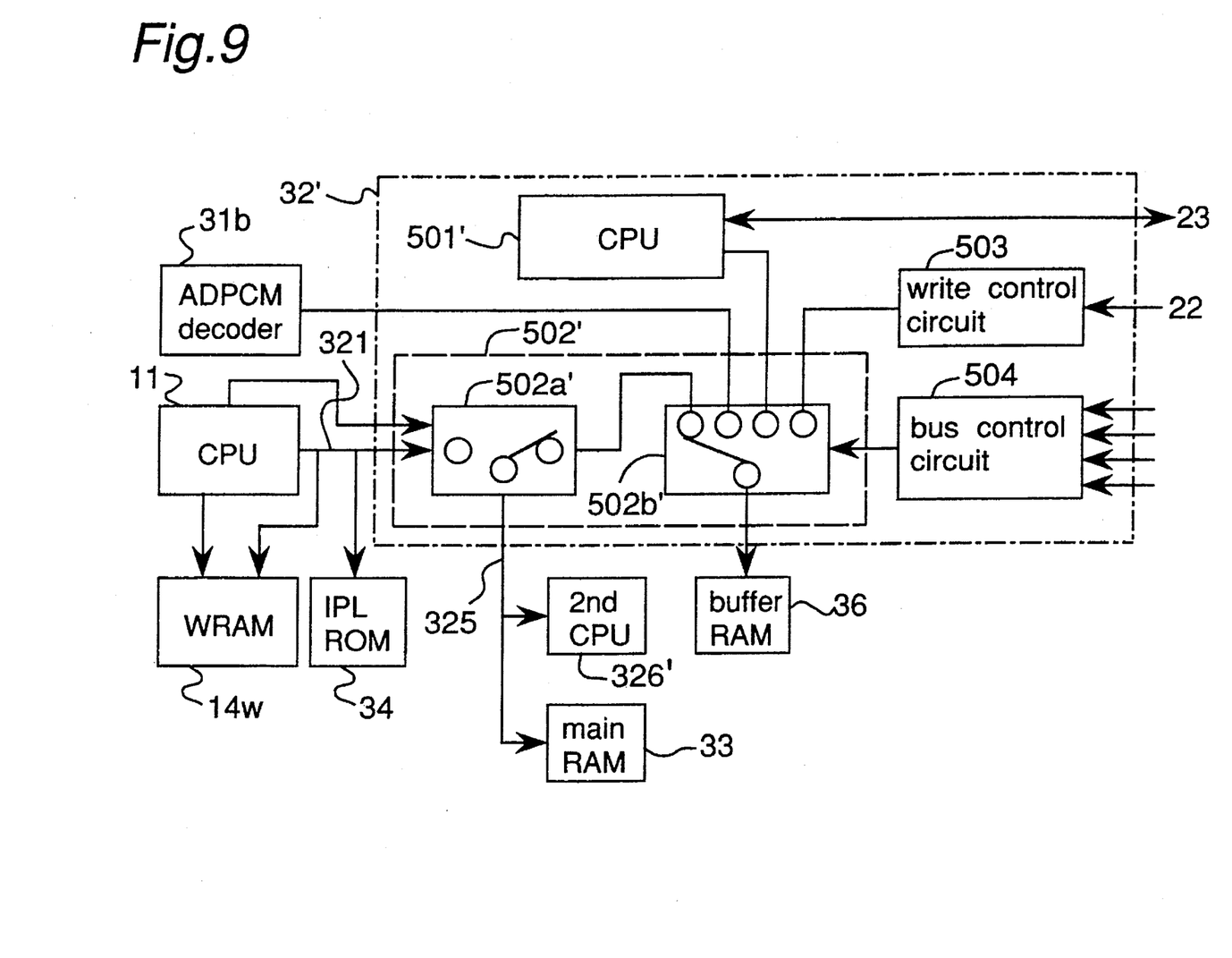
FIG. 9 is a block diagram of the second example of a system controller.

FIG. 9 shows the connection of the system cartridge 30' to other data sources in detail. The system controller 32' comprises a CPU 501', a bus change circuit 502' including two switches 502a' and 502b', a bus write controller 503 and a bus controller 504 used for bus control exclusively. The CPU 11 controls the first switch 501a' to connect the second CPU 326 and the main RAM 33 via the "V" bus 325 to the CPU 11 or to the second switch 502b'. The second bus switch 502' is controlled automatically according to a timing suitable for a data source to be connected. That is, if a request signal from a data source to be connected is received by the bus controller 504, the second switch is changed to connect the buffer RAM 36 to either of the first switch 501a', an AD-PCM decoder 31b, the CPU 501' or a write controller 503, so that data from the connected data source can be written in the buffer RAM 36. Thus, the buffer memory stored in the buffer RAM 36 by many data sources can be processed by the second CPU 326' or by the first CPU 11.

As explained above, the present invention uses different kinds of processors to perform processing tasks for which each kind of processor is best suited via selective bus switching to coordinate the various data processing tasks. As a result, the overall processing time is faster and the wait time of a user can be reduced to a large extent.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information processing apparatus conducting picture processing using data stored in an optical storage medium that stores data including at least picture processing data and is connectable to the information processing apparatus, comprising:

an optical reader for reproducing data stored in the optical storage medium;

a semiconductor storage storing data sent from the optical reader in an as-received data format;

a first central processing unit for processing data stored in the semiconductor storage;

a second central processing unit having a better data handling capability than the first central processing unit;

a first data bus connected to the first central processing unit;

a second data bus connected to the second central processing unit and to the semiconductor storage;

a bus selector for connecting the optical reader to the second data bus in a first mode, for disconnecting the first data bus from the second data bus in a second mode, and for connecting the second data bus to the first data bus in a third mode.

2. The information processing apparatus according to claim 1, wherein said optical storage medium comprises an optical disk.

3. The information processing apparatus according to claim 1, wherein said optical disk comprises a CD-ROM.

4. The information processing apparatus according to claim 1, wherein a number of bits in each data operand to be accessed by said second central processing unit is larger than that for said first central processing unit.

5. The information processing apparatus according to claim 2, wherein a number of bits in each data operand processed by said second central processing unit is a natural number times that for said first central process unit.

6. The information processing apparatus according to claim 1, wherein a processing speed of said second central processing unit is faster than that of said first central processing unit.

7. The information processing apparatus according to claim 1, wherein said first central processing unit controls the bus selector to the first mode at start-up and changes to the second or third mode after the start-up.

8. The information processing apparatus according to claim 1, wherein data reproduced by said optical reader are sent to the second data bus as serial data in the first mode.

9. An information processing apparatus conducting picture processing using data stored in an optical storage medium connectable to the information processing apparatus that stores data including at least picture processing data comprising:

an optical reader for reproducing data stored in the optical storage medium;

a semiconductor storage storing data sent from the optical reader in an as-received data format;

a first central processing unit for processing data stored in the semiconductor storage means;

a second central processing unit having a better data handling capability than the first central processing unit;

a first data bus connected to the first central processing unit;

a second data bus connected to the second central processing unit and to the semiconductor storage;

a bus selector for connecting the optical reader to the second data bus in a first mode, for disconnecting the first data bus from the second data bus in a second mode, and for connecting the second data bus to the first data bus in a third mode, wherein said second central processing unit conducts a preliminary data processing operation on the data stored in said semiconductor storage and writes a result of the preliminary operation in said semiconductor storage; and said first central processing unit processes an application program of said information processing apparatus based on the data stored in the semiconductor storage in the third mode using results of the preliminary data processing operation stored in the semiconductor storage.

10. The information processing apparatus according to claim 9, wherein said optical storage medium stores picture data and program data optically;

said second central processing unit performs a preliminary operation relevant to picture processing based on the program data stored in said semiconductor storage and stores a result of the preliminary operation in said semiconductor storage; and said first central processing unit performs the application program using program data stored in said semiconductor storage and/or performs processing for displaying a picture based on the result of the preliminary operation.

11. The information processing apparatus according to claim 9, wherein said preliminary operation processed by said second central processing unit includes data expansion of picture data stored in said semiconductor storage.

12. The information processing apparatus according to claim 9, wherein said preliminary operation processed by said second central processing unit is processed at a fast rate.

13. The information processing apparatus according to claim 9, further comprising:

an input device connected to said first central processing unit operated by a user for inputting an instruction;

wherein said first central processing unit conducts processing for the application program based on data stored in the semiconductor storage in the third mode using the results of the preliminary operation stored in the semiconductor storage and the instruction provided with the input device.

14. The information processing apparatus according to claim 13, wherein said input device comprises a joy stick.

15. The information processing apparatus according to claim 1, further comprising a non-volatile storage, connected to said first central processing unit for storing a start-up program conducted by the first central processing unit for changing the bus selector to the first mode upon start-up of the optical reader and for changing the bus selector to the second or third mode after the start-up.

16. An information processing apparatus conducting picture processing using data stored in an optical storage medium connectable to the information processing apparatus that stores data including at least picture processing data, comprising:

an optical reader for reproducing data stored in the optical storage medium;

a semiconductor storage storing data sent from the optical reader in an as-received data format;

a first central processing unit for processing data stored in the semiconductor storage;

a second central processing unit having a better data handling capability than the first central processing unit;

a first data bus connected to the first central processing unit;

a second data bus connected to the second central processing unit and to the semiconductor storage;

a bus selector for connecting the optical reader to the second data bus in a first mode, for disconnecting the first data bus from the second data bus in a second mode, and for connecting the second data bus to the first data bus in a third mode;

a second semiconductor storage storing data sent from the optical reader in an as-received data format;

a third central processing unit for processing data stored in the second semiconductor storage;

a second data bus connected to the third central processing unit and to the second semiconductor storage;

wherein said bus selector connects the third data bus to said optical reader.

17. The information processing apparatus according to claim 16, wherein said optical storage medium optically stores audio data compressed with adaptive differential pulse code modification, said third central processing result processing the audio data, which information processing apparatus further comprising: a data converter for demodulating the compressed audio data stored in said second semiconductor storage using adaptive differential pulse code demodulation, said data converter being connected to said third data bus.

18. The information processing apparatus according to claim 1, further comprising a third semiconductor storage connected via said bus selector to either of said first and second data buses and said optical reader.

* * * * *